United States Patent [19]

Chi

[11] Patent Number: 5,181,437
[45] Date of Patent: Jan. 26, 1993

[54] HUB OF A BICYCLE

[76] Inventor: Yi C. Chi, No. 139-5, An Mei Rd., Mei Shan Village, Hou Li Hsiang, Taichung Hsien, Taiwan

[21] Appl. No.: 912,771

[22] Filed: Jul. 13, 1992

[51] Int. Cl.$^5$ .............. G05G 1/14; B60B 35/00; F16C 13/00
[52] U.S. Cl. .................. 74/594.1; 74/594.2; 301/105 R; 301/124 R; 384/545; 384/512
[58] Field of Search .......... 74/594.1, 594.2, 594.3; 384/545, 512, 513, 498; 301/105 R, 124 R

[56] References Cited

U.S. PATENT DOCUMENTS

| | | | |
|---|---|---|---|
| 3,241,894 | 3/1966 | Duffy | 384/545 |
| 4,508,397 | 4/1985 | Hofmann et al. | 384/545 X |
| 4,594,910 | 6/1986 | Nagano | 74/594.2 |
| 4,605,321 | 8/1986 | Brandenstein et al. | 384/545 X |
| 4,606,658 | 8/1986 | Hofmann et al. | 384/512 X |
| 4,738,551 | 4/1988 | Chi | 384/545 X |
| 4,810,040 | 3/1989 | Chi | 301/124 R X |
| 4,825,719 | 5/1989 | Romano | 74/594.1 |
| 4,969,754 | 11/1990 | Rohrer et al. | 384/513 X |
| 5,106,210 | 4/1992 | Chi | 384/498 |
| 5,118,205 | 6/1992 | Hoffmann | 384/545 X |

FOREIGN PATENT DOCUMENTS

| | | | |
|---|---|---|---|
| 3821051 | 12/1989 | Fed. Rep. of Germany | 384/512 |
| 586077 | 3/1925 | France | 384/545 |
| 1-180393 | 12/1989 | Japan | 74/594.1 |

Primary Examiner—Vinh T. Luong
Attorney, Agent, or Firm—Louis Weinstein

[57] ABSTRACT

A hub of a bicycle including a hub shell having a tapered surface formed in each end, an axle disposed in the hub shell, two bearings engaged on the axle, a tube engaged on the bearings and having a cone formed on one end, the cone having a tapered surface engaged with one of the tapered surfaces of the hub shell, and a cap threadedly engaged on the other end of the tube and including a tapered surface for engagement with the other tapered surface of the hub shell, whereby, the hub shell is clamped between the cone and the cap.

2 Claims, 3 Drawing Sheets

HUB OF A BICYCLE

BACKGROUND OF THE INVENTION

1. Field of the Invention

The present invention relates to a hub, and more particularly to a hub of a bicycle.

2. Description of the Prior Art

The closest prior art of which applicant is aware is his prior U.S. Pat. No. 4,810,040 to Chi, entitled "BRACKET BEARING AXLE DEVICE FOR BICYCLE", filed Feb. 19, 1988. Generally, the hub includes a pair of dust caps 2, 3 provided on both end portions of the axle 1 and to be threadedly engaged in the end portions of the hub shell 4 of the bicycle; however, when one of the dust caps is threadedly engaged in one end of the hub shell, the axle 1 may not precisely coincide with the axis of the hub shell so that the other dust cap can not be easily threaded into place; this causes difficulty for assembling the hub.

The present invention has arisen to mitigate and/or obviate the afore-described disadvantages of the conventional bicycle hubs.

SUMMARY OF THE INVENTION

The primary objective of the present invention is to provide a hub of a bicycle in which the hub can be easily assembled.

In accordance with one aspect of the invention, there is provided a hub of a bicycle comprising a hub shell including a first tapered surface formed in a first end portion thereof and a second tapered surface formed in a second end portion thereof, an axle rotatably provided in the hub shell and including a pair of tracks formed on an outer peripheral portion thereof, a bearing engaged on each of the tracks, a tube including two end portions engaged on the bearings respectively and including a cone formed integral on a first end portion thereof and an outer thread formed in a second end portion thereof, the cone including a third tapered surface formed in an outer peripheral portion thereof for engagement with the first tapered surface of the hub shell, and a cap including an inner thread formed therein for threaded engagement with the outer thread of the tube and including a fourth tapered surface formed in an outer peripheral portion thereof for engagement with the second tapered surface of the hub shell, whereby, the hub shell is clamped between the cone and the cap.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
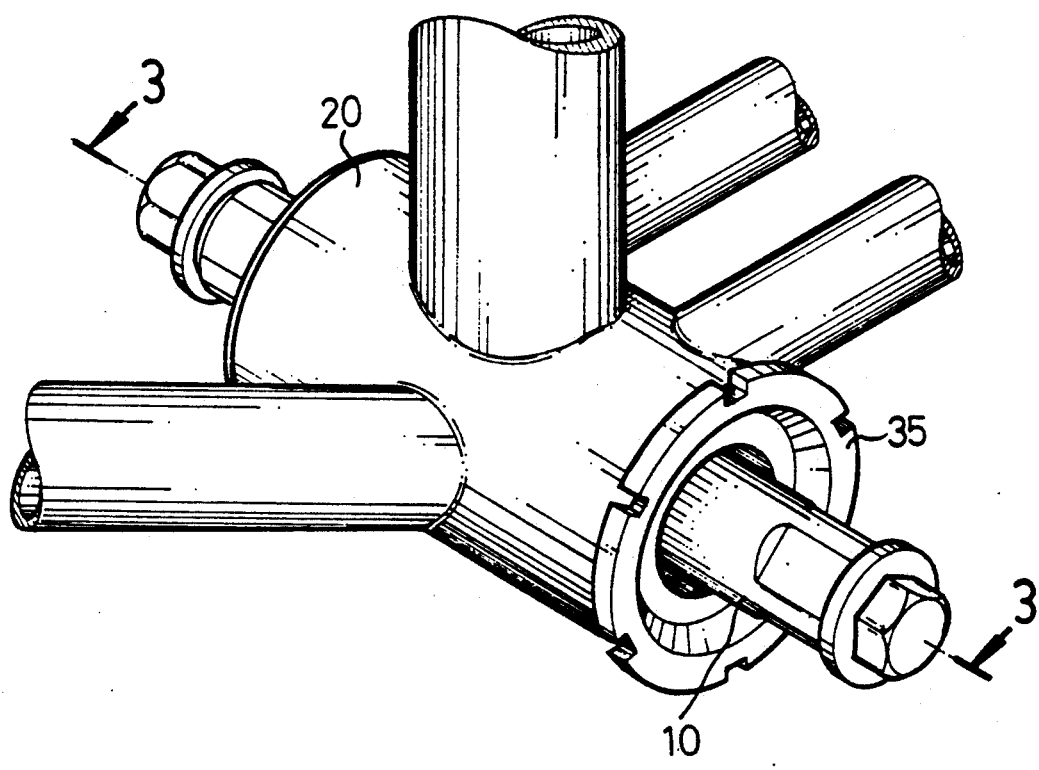
FIG. 1 is a perspective view of a hub in accordance with the present invention.
Figure 2:
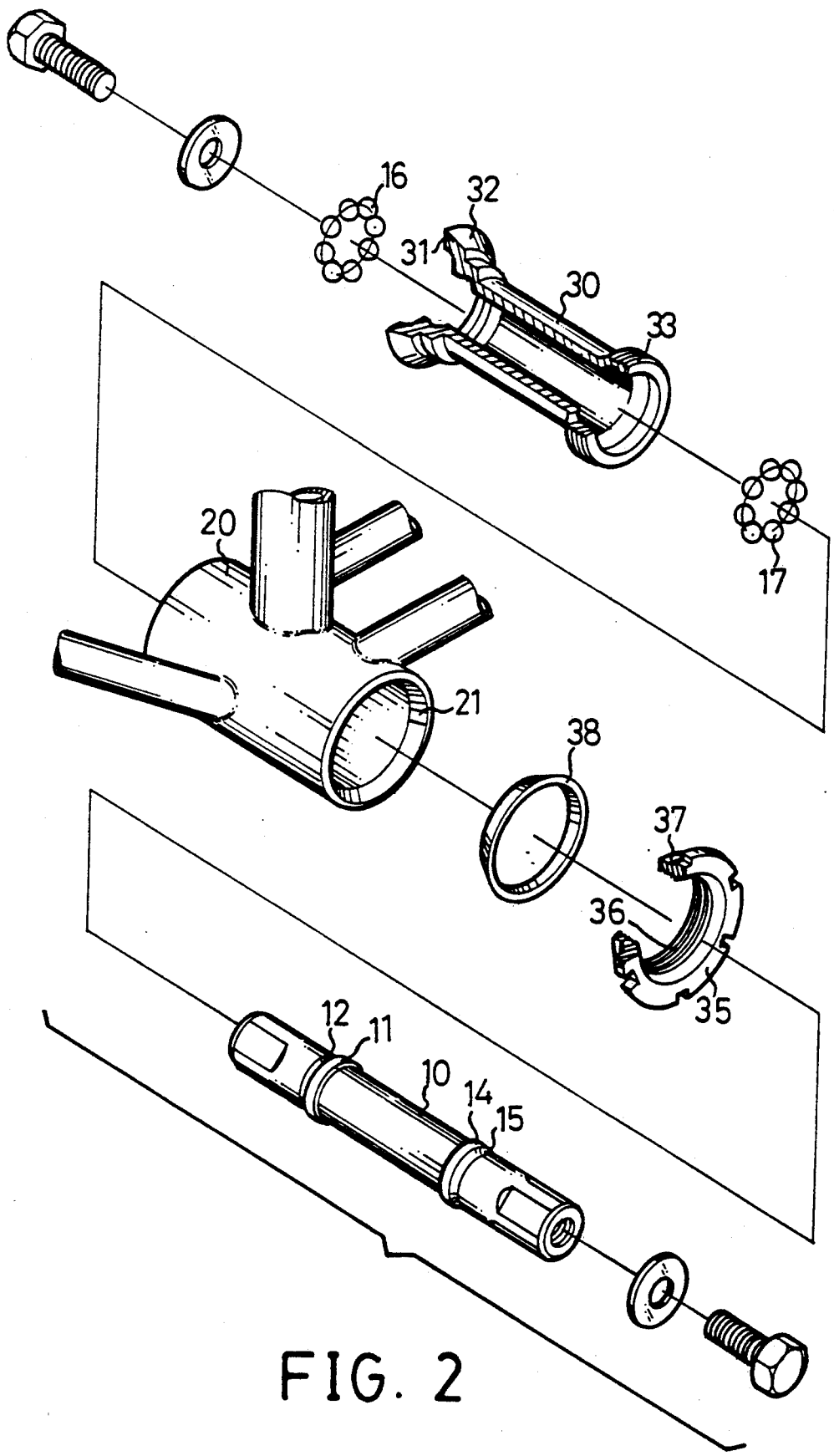
FIG. 2 is an exploded view of the hub.
Figure 3:
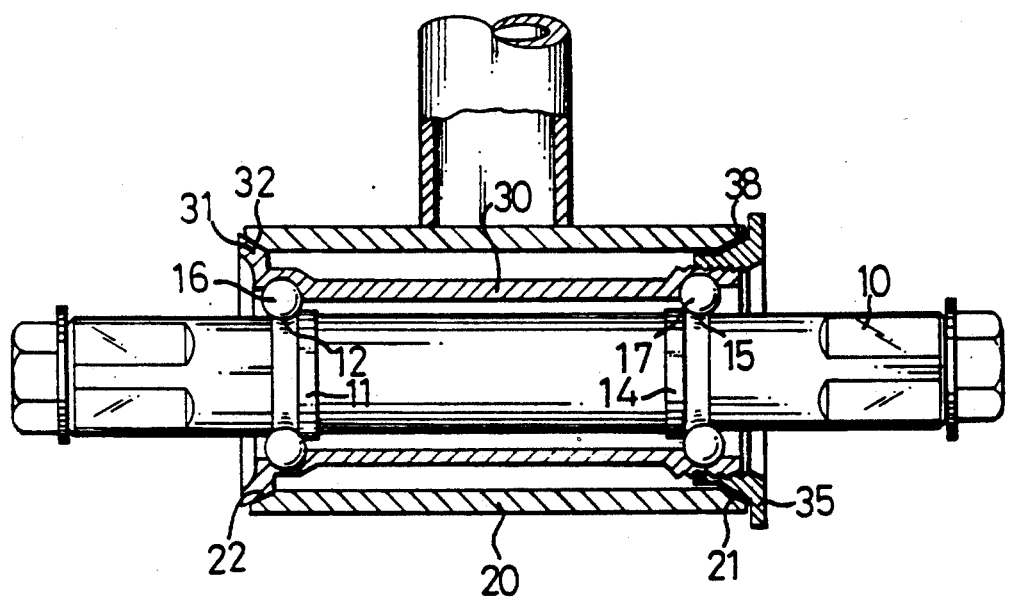
FIG. 3 is a cross sectional view of the hub taken along lines 3—3 of FIG. 1.

Referring to the drawings, a hub in accordance with the present invention comprises generally an axle 10 rotatably provided in the hub shell 20, the hub shell 20 includes a tapered surface 21, 22 formed in each end thereof, the axle 10 includes a pair of annular ribs 11, 14 formed thereon, each of the annular ribs 11, 14 includes an annular track 12, 15 formed on one side thereof for engagement with a bearing 16, 17 respectively.

A tube 30 is engaged between the axle 10 and the hub shell 20 and includes two ends engaged on the bearings 16, 17 respectively, the tube 30 includes a cone 31 formed integral on one end thereof and an outer thread 33 formed on the outer peripheral portion of the other end thereof, the cone 31 includes a tapered surface 32 formed in the outer peripheral portion thereof for engagement with the tapered surface 22 of the hub shell 20, and a cap 35 includes an inner thread 36 formed therein for threaded engagement with the outer thread 33 of the tube 30 and includes a tapered surface 37 formed in the outer peripheral portion thereof for engagement with the tapered surface 21 of the hub shell 20, and a sealing ring 38 is engaged between the tapered surfaces 21, 37 of the hub shell 20 and the cap 35.

In assembling operations, it is only required to threadedly engage the cap 35 onto the outer thread 33 of the tube 30 such that the hub shell 20 can be stably engaged and clamped between the cone 31 and the cap 35.

Accordingly, the hub can be easily assembled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A hub of a bicycle comprising a hub shell including a first tapered surface formed in a first end portion thereof and a second tapered surface formed in a second end portion thereof, an axle rotatably provided in said hub shell and including a pair of tracks formed on an outer peripheral portion thereof, a bearing engaged on each of said tracks, a tube including two end portions engaged on said bearings respectively and including a cone formed integral on a first end portion thereof and an outer thread formed in a second end portion thereof, said cone including a third tapered surface formed in an outer peripheral portion thereof for engagement with said first tapered surface of said hub shell, and a cap including an inner thread formed therein for threaded engagement with said outer thread of said tube and including a fourth tapered surface formed in an outer peripheral portion thereof for engagement with said second tapered surface of said hub shell, whereby, said hub shell is clamped between said cone and said cap.

2. A hub of a bicycle comprising a hub shell including a first tapered surface formed in a first end portion thereof and a second tapered surface formed in a second end portion thereof, an axle rotatably provided in said hub shell and including a pair of annular ribs formed thereon, a track formed on one side of each of said annular ribs, a bearing engaged on each of said tracks, a tube including two end portions engaged on said bearings respectively and including a cone formed integral on a first end portion thereof and an outer thread formed in a second end portion thereof, said cone including a third tapered surface formed in an outer peripheral portion thereof for engagement with said first tapered surface of said hub shell, and a cap including an inner thread formed therein for threaded engagement with said outer thread of said tube and including a fourth tapered surface formed in an outer peripheral portion thereof for engagement with said second tapered surface of said hub shell, and a sealing ring engaged between said second tapered surface of said hub shell and said fourth tapered surface of said cap, whereby, said hub shell is clamped between said cone and said cap.

* * * * *